United States Patent
Belmonte et al.

(10) Patent No.: US 10,730,608 B2
(45) Date of Patent: Aug. 4, 2020

(54) VARIABLE PITCH BLADE PIVOT FOR A TURBINE ENGINE FAN HUB

(71) Applicant: SAFRAN AIRCRAFT ENGINES, Paris (FR)

(72) Inventors: Olivier Belmonte, Perthes en Gatinais (FR); Christophe Paul Jacquemard, Hericy (FR); Clementine Charlotte Marie Mouton, Tournan en Brie (FR); Emmanuel Pierre Dimitri Patsouris, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 202 days.

(21) Appl. No.: 16/067,981

(22) PCT Filed: Jan. 4, 2017

(86) PCT No.: PCT/FR2017/050010
§ 371 (c)(1),
(2) Date: Jul. 3, 2018

(87) PCT Pub. No.: WO2017/118808
PCT Pub. Date: Jul. 13, 2017

(65) Prior Publication Data
US 2019/0010957 A1 Jan. 10, 2019

(30) Foreign Application Priority Data
Jan. 5, 2016 (FR) .................................. 16 50040

(51) Int. Cl.
*B64C 11/06* (2006.01)
*F01D 7/00* (2006.01)
*F02C 6/20* (2006.01)

(52) U.S. Cl.
CPC ............... *B64C 11/06* (2013.01); *F01D 7/00* (2013.01); *F02C 6/206* (2013.01);
(Continued)

(58) Field of Classification Search
CPC ........... B64C 11/06; B64C 11/32; F01D 7/00
See application file for complete search history.

(56) References Cited

U.S. PATENT DOCUMENTS 2,017,505 A * 10/1935 Meon ..................... B64C 11/06
416/147
8,047,792 B2 * 11/2011 Bech ..................... F03D 1/0658
416/147

(Continued)

FOREIGN PATENT DOCUMENTS

GB          546621        7/1942

OTHER PUBLICATIONS

International Search Report dated Apr. 7, 2017, in PCT1FR2017/050010 filed Jan. 4, 2017.

*Primary Examiner* — Woody A Lee, Jr
(74) *Attorney, Agent, or Firm* — Oblon, McClelland, Maier & Neustadt, L.L.P.

(57) ABSTRACT

A pivot for an adjustable-pitch blade for a turbine engine fan hub, the pivot including a stud having coupling device for transmitting a twisting torque and an outside thread, a force-decoupling part positioned around the stud, provided with an outside thread, pressing transversely against the stud at its radially outer end, an outer rolling bearing having an inside ring mounted to press transversely against the force-decoupling part, an inner rolling bearing assembled around the force-decoupling part and held thereby, a pitch transmission ring provided with a coupling device co-operating, with the coupling device of the stud, a first clamping nut screwed onto the outside thread of the force-decoupling part in order to clamp the outer and inner rolling bearings around (Continued)

the fan hub, and a second clamping nut screwed onto the outside thread of the stud in order to provide clamping between the stud, the force-decoupling part, and the pitch transmission ring.

9 Claims, 3 Drawing Sheets

(52) U.S. Cl.
CPC ...... *F05D 2260/74* (2013.01); *F05D 2260/79* (2013.01); *F16C 2360/23* (2013.01); *Y02T 50/66* (2013.01); *Y02T 50/673* (2013.01)

(56) References Cited

U.S. PATENT DOCUMENTS 9,816,385 B2 * 11/2017 Fabre .................. F01D 7/00
9,849,969 B2 * 12/2017 Nagle .................. B64C 11/26

* cited by examiner

VARIABLE PITCH BLADE PIVOT FOR A TURBINE ENGINE FAN HUB

BACKGROUND OF THE INVENTION

The present invention relates to the general field of turbine engines having one or two optionally ducted fans, and more particularly to controlling the pitch of the fan blades in such turbine engines.

A preferred field of application of the invention lies with turbojets having contrarotating propellers, also known as "open rotors", comprising two contrarotating propellers, placed downstream (in a "pusher" configuration) or upstream (in a "puller" configuration) of the gas generator. Nevertheless, the invention also applies to turboprops having one or more propulsive propellers.

In a turbojet with one or more propellers, it is known that the pitch (or orientation) of the blades constituting such propellers constitutes one of the parameters enabling the thrust of the turbojet to be managed, in particular by causing the propeller to operate always under the best possible conditions. Specifically, the speed of the propellers is also constant during all stages of flight, and it is the pitch of the propeller blades that serves to vary thrust. Thus, during a stage of cruising flight, it is desired to obtain the lowest possible power on the turbine shaft that is compatible with given traction at a given airplane speed, so as to obtain the best efficiency (i.e. the efficiency that serves to minimize fuel consumption and increase range). Conversely, on take-off, the highest possible traction is sought in order to cause the airplane to accelerate and then take off.

Typically, each propeller has a plurality of fan blades, each of which comprises an aerodynamic profile (or "airfoil") and a pivot. The pivots perform several functions: via rolling bearings, they serve to retain the fan blades in operation and to guide them in order to set their pitch.

Furthermore, for turbojet architectures of the "open rotor" type in the "puller" version, the turbojet itself constitutes an oil enclosure that needs to be made leaktight (or from which leaks need to be under control). Unfortunately, on known fan blade pivot systems, since the structure situated beneath the propeller is not an enclosure, this sealing function is not guaranteed.

Furthermore, with known pivot systems, it is necessary to open the casing situated upstream from the propeller in order to be able to disassemble the pivots and perform maintenance on the blades. Nevertheless, with an "open rotor" type turbojet in the "puller" version, such a maintenance operation is particularly troublesome since it is necessary to rebuild the entire oil enclosure installation, including its pressurization. In addition, the presence of two propellers, fitted with their respective rotary drive shafts and their respective blade pitch control systems, greatly restricts access to the pivots of the fan blades. Furthermore, when it is necessary to perform a maintenance operation on a single downstream fan blade airfoil, it becomes necessary to remove the engine, and the upstream propeller assembly needs to be dismantled together with its systems, and so do the control systems for the downstream propeller.

Document U.S. Pat. No. 8,057,184 discloses a fan blade pivot in which all of the parts forming the pivot are subjected to all of the (centrifugal and aerodynamic) forces, which means that those parts need to be overdimensioned in order to enable the pivot to withstand stresses in twisting, in compression, and in stretching.

Furthermore, the pivot generates a plurality of concurrent force paths, which is not desirable and makes the pivot difficult to dismantle.

Also known from Document FR 2 953 195 is a fan blade pivot in which the balls of the bottom bearing need to be positioned after the pivot has been mounted, thereby making the bearing more complex to replace. Furthermore, all of the parts of the pivot are subjected to all of the (centrifugal and aerodynamic) forces, which means that those parts need to be overdimensioned in order to enable the pivot to withstand stresses in twisting, compression, and stretching.

OBJECT AND SUMMARY OF THE INVENTION

A main object of the present invention is thus to propose a pivot for an adjustable pitch blade that does not present the above-mentioned drawbacks.

In accordance with the invention, this object is achieved by a pivot for an adjustable pitch blade for a turbine engine fan hub, the pivot comprising:
  a stud having, at a radially inner end, coupling means for transmitting a twisting torque and an outside thread;
  an annular force-decoupling part positioned around the stud and provided at a radially outer end with an outside thread, said force-decoupling part pressing transversely against the stud at its radially outer end and having no contact with said stud at a radially inner end;
  an outer rolling bearing having an inside ring mounted to press transversely against the radially outer end of the force-decoupling part;
  an inner rolling bearing assembled around the radially inner end of the force-decoupling part and held thereby;
  a pitch transmission ring positioned around the radially inner end of the stud and provided with coupling means co-operating with the coupling means of the stud;
  a first clamping nut screwed onto the outside thread of the force-decoupling part in order to clamp the outer and inner rolling bearings around the fan hub; and
  a second clamping nut screwed onto the outside thread of the stud in order to provide clamping between the stud, the force-decoupling part, and the pitch transmission ring.

The pivot of the invention is remarkable in particular in that by means of the various distinct elements that make it up, it serves to separate force paths. Thus, the centrifugal force to which the fan blade is subjected passes in this example directly through the stud of the pivot in order to be taken up radially via the inner rolling bearing. The forces that are transverse (relative to the pivot axis) are themselves taken up by the top rolling bearing and they pass through the radially outer end of the force-decoupling part. Furthermore, the direct contact between the inside ring of the outer rolling bearing and the force-decoupling part serves to take up the majority of the bending forces to which the blade is subjected. Finally, the particular arrangement of the pivot of the invention makes it possible to limit bending forces within the pivot (and resulting from the aerodynamic forces to which the blade is subjected).

The pivot of the invention also presents the advantage of dissociating the various functions that it performs. In particular, if it is necessary to perform maintenance on the pivot, there is no need to remove all of its elements (including the inner and outer bearings and the force-decoupling part). Furthermore, changing the rolling bearings of the pivot of the invention is relatively easy since the pivot makes it possible to have a unitary assembly comprising the two rings and the balls of the bearings (or the two separated rings and a set of balls held captive in a cage). By dissociating the functions performed by the pivot, it is likewise possible to act on a single fan blade without needing to remove an engine and to dismantle the entire propeller assembly. Finally, it should be observed that the pivot of the invention also presents the advantage of being capable of being assembled on the fan hub without it being necessary to make raceways on the hub, thereby enabling the hub to be made of an alloy of titanium type.

The outer rolling bearing may also have an outside ring for being received inside an orifice formed in the fan hub and having the pivot passing therethrough, the inside and outside rings defining raceways for a plurality of balls. Under such circumstances, the first clamping nut is preferably screwed radially against the inside ring of the outer rolling bearing.

The inner rolling bearing may include an outside ring mounted around the radially inner end of the force-decoupling part and co-operating with an outside surface thereof to define raceways for a plurality of balls.

The coupling means of the stud may be outer fluting and the coupling means of the pitch transmission ring may be inner fluting co-operating with the outer flutings of said stud.

In an embodiment, the stud the stud comprises two distinct portions that are connected together: a radial portion having the coupling means for transmitting twisting torque and the outside clamping thread; and an attachment portion including a radial hole having the radial portion passed therethrough. This embodiment makes it possible to use a titanium type alloy for the portion that does not have a thread (i.e. the attachment portion).

In this embodiment, the attachment portion may further include a spot face formed around the hole in order to receive a collar of the radial portion so as to provide a connection between the two portions of the pivot.

The invention also provides a blade of variable pitch angle for a turbine engine fan hub, the blade comprising an aerodynamic profile and a pivot as defined above. The invention also provides a turbine engine including a fan hub and at least one set of such blades of variable pitch angle.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF THE INVENTION

The invention applies to any turbine engine having at least one ducted or unducted fan, and in which the propeller blades (for an unducted fan) or the fan blades (for a ducted fan) are fitted with a pitch-changer system.

The invention applies in particular to turboprops having one or more propulsive propellers, and also to open rotor turbojets that have either one propeller (and a variable pitch stator for an unducted single fan (USF)), or else two contrarotating propellers, that may be located upstream (in a "puller" configuration) or downstream (in a "pusher" configuration) of the gas generator. The invention also applies to ducted-fan turbine engines.

The architecture of these types of turbine engine is well known to the person skilled in the art and it is not described in greater detail herein. Briefly, such turbine engines have one or more propellers (for an unducted fan engine) or a fan (for a ducted fan engine) each made up of a set of variable pitch fan blades, i.e. blades of orientation that can be modified by means of a system for controlling blade pitch, as described below.

In the description below, the terms "propeller" and "propeller blade" are used interchangeably since the invention applies to an unducted fan engine or to a ducted fan engine (in which case the propeller corresponds to the fan of the engine and the propeller blades correspond to the fan blades).

A turbine engine propeller is made up of a set of optionally independent variable pitch fan blades, i.e. blades of orientation that can be modified by means of a blade pitch control system.

Figure 1:
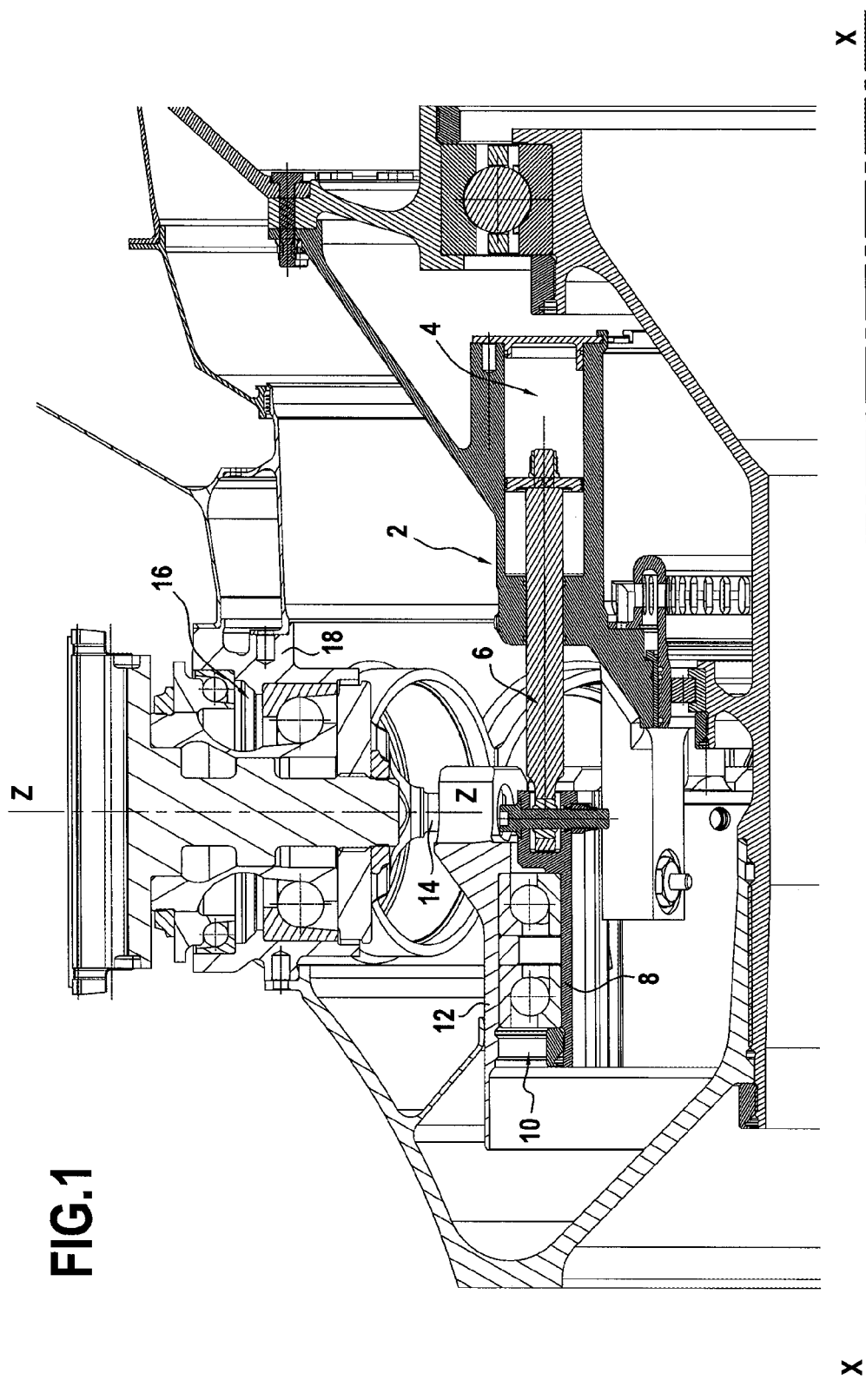
FIG. 1 is a section view showing an example of installing a pivot for an adjustable pitch fan blade in an embodiment of the invention.

As shown in FIG. 1, the control system may comprise an axial actuator 2 centered on the axis of rotation X-X of the propeller and stationary relative to the structures of the engine. The actuator 2 has a chamber 4 and rods 6 that can move axially in synchronized manner when the actuator is actuated. At their free ends, the rods 6 are connected to the inside ring 8 of a load transfer rolling bearing 10 having its outside ring 12 coupled via a lever arm 14 to pivots 16 of the fan blades of the propeller. Thus, when the actuator 2 is actuated, the rods 6 move in translation to move the load transfer rolling bearing 10, thereby causing the pivots 16 of the fan blades to pivot about their radial axes Z-Z.

It should be observed that it is possible to have an opposite configuration in which the rods of the actuator are secured to the engine casing and it is the actuator cylinder that is movable relative to the actuator rods.

More precisely, the function of the pivot 16 is to retain the fan blade on the rotary fan hub 18 and to guide it while varying its pitch.

To this end, the pivot 16 of the fan blade is mounted radially in an orifice 20 in the hub 18 of the propeller, which it passes right through, the hub being centered on the longitudinal axis X-X of the turbine engine.

Figure 2:
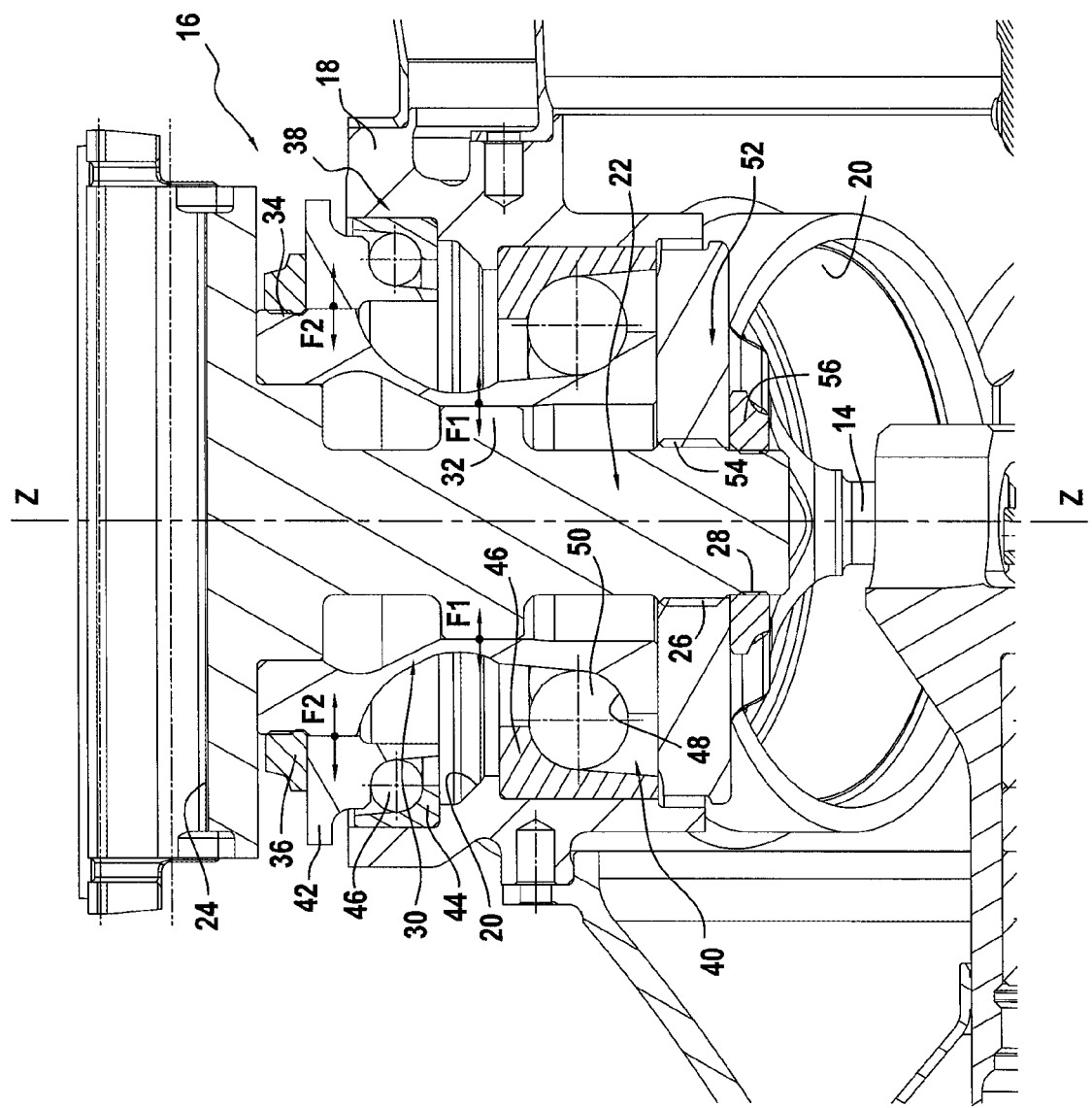
FIG. 2 shows a detail of FIG. 1, showing more particularly the blade pivot.

In the invention, and as shown in FIG. 2, the pivot 16 of the fan blade has a plurality of distinct elements that are assembled together so as to make it easier to assemble on and to remove from the hub of the propeller.

Thus, the pivot 16 includes in particular a stud 22 that extends along the radial axis Z-Z of the pivot through the orifice 20 of the fan hub 18 and that presents a tooth 24 at a radially outer end (i.e. at its end furthest from the axis X-X), which tooth is to receive a root of the fan blade (not shown in the figures). It should be observed that the fan blade might be integral with the stud.

At its radially inner end (i.e. at its end closest to the axis X-X), the stud 22 has outer fluting 26 for transmitting twisting torque and an outside thread 28 for tightening.

The pivot 16 of the invention also has an annular force-decoupling part 30 that is positioned around the stud 22. This force-decoupling part is centered on the radial axis Z-Z of the stud 22, and presses transversely against the stud via its radially outer end and via an annular collar 32, and has no contact therewith at a radially inner end. The transverse pressure between the collar 32 of the stud and the force-decoupling part is represented in FIG. 2 by arrows F1.

At its radially outer end, the force-decoupling part 30 is provided with an outside thread 34 having a first nut 36 tightened thereon, and likewise centered on the radial axis Z-Z of the stud.

The pivot 16 of the invention also has an outer rolling bearing 38 (i.e. situated on the outside of the pivot) and an inner rolling bearing 40 (i.e. situated on the inside of the pivot) both of which are mounted around the force-decoupling part, respectively at its radially outer end and at a radially inner end thereof.

More precisely, the outer rolling bearing 38 is of the oblique contact type and has an inside ring 42 and an outside ring 44 that defines raceways for a plurality of balls 46. The outside ring 44 presses radially against the inside of the orifice 20 formed in the rotary hub 18.

The inside ring 42 of this outer rolling bearing presses transversely against the radially outer end of the force-decoupling part (with this pressure being represented by arrows F2 in FIG. 2). Tightening the first clamping nut 36 on the force-decoupling part thus serves to apply stress against the outer rolling bearing 38.

The inner rolling bearing 40 is of the oblique contact type and it has an outside ring 47 likewise for pressing radially against the inside of the orifice 20 formed in the fan hub 18. Furthermore, this outside ring co-operates with an outside surface 48 of the radially inner end of the force-decoupling part 30 to define raceways for a plurality of balls 50.

The pivot 16 of the invention also has a pitch transmission ring 52 that also forms an annular sealing cover for an oil enclosure situated inside the control system. This pitch transmission ring 52 is positioned around the radially inner end of the stud 22, being centered on its radial axis Z-Z. This pitch transmission ring is provided with inner fluting 54 that co-operates with the outer fluting 26 of said stud. It should be observed that coupling means other than fluting could be envisaged between the pitch transmission ring and the stud.

A second clamping nut 56 is screwed onto the outside thread 28 formed on the radially inner end of the stud 22 in order to provide radial clamping between the stud 22, the force-decoupling part 30, and the pitch transmission ring 52. This clamping also makes it possible to apply stress to the inner rolling bearing 40.

Figure 3:
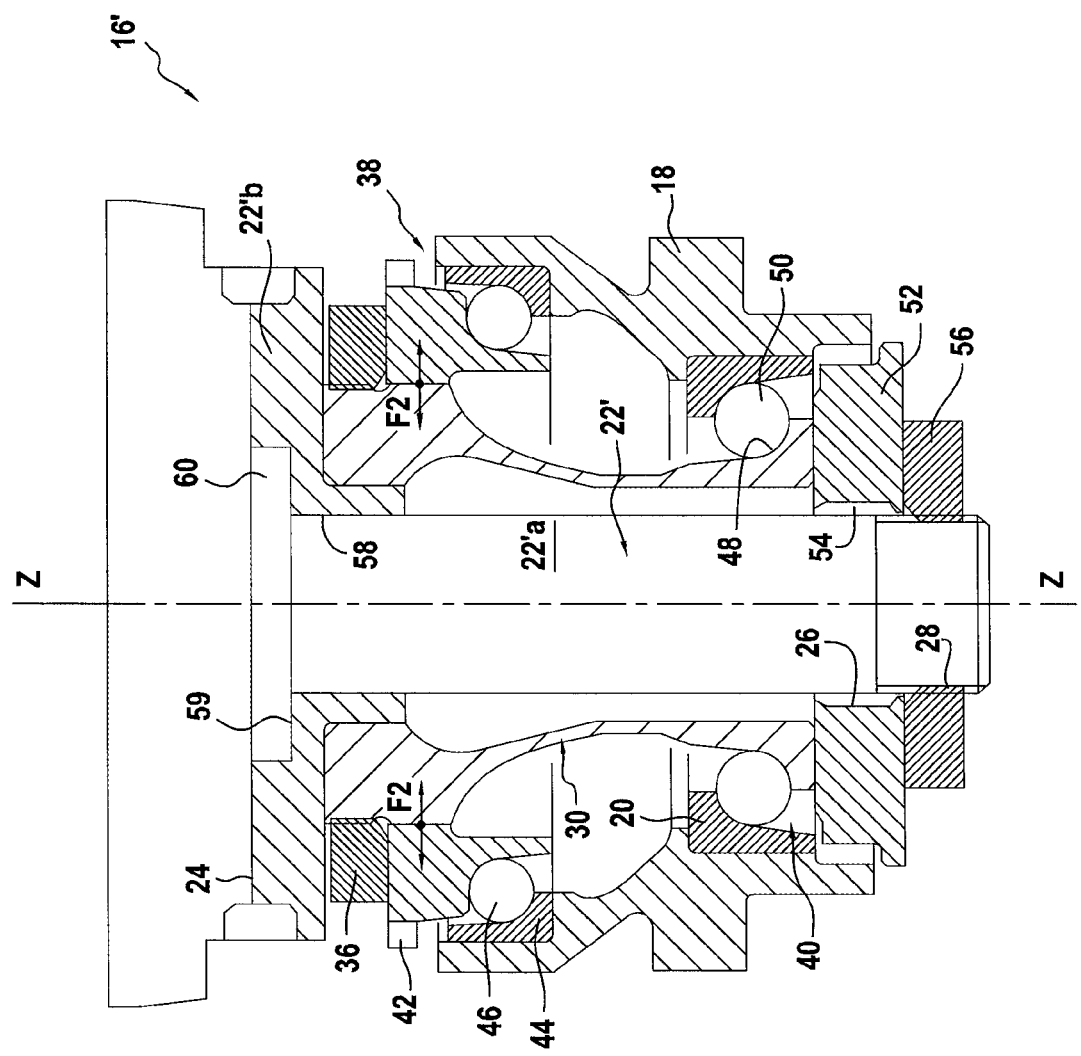
FIG. 3 is a section view showing a pivot in another embodiment of the invention.

FIG. 3 shows a variant embodiment of the pivot of the invention. In FIG. 3, the elements of the pivot 16' that are identical to those of the pivot in the embodiment of FIG. 2 are given the same references.

In this example, the stud 22' of the pivot 16' is made up of two distinct portions that are connected together, namely a radial portion 22'a having the outer fluting 26 for transmitting twisting torque and the outside clamping thread 34, and an attachment portion 22'b having the tooth 24 and a radial hole 58 through which the radial portion 22'a passes.

Under such circumstances, the attachment portion 22'b also has a spot face 59 formed around the hole 58 in order to receive a collar 60 of the radial portion 22'a in order to provide a connection between the two portions of the pivot.

The advantage of separating the stud into two distinct portions is that it is possible to use two different materials for making these portions of the stud, thereby saving weight.

Whatever the embodiment, the pivot of the invention is thus relatively easy to assemble, which is done by initially unscrewing the clamping nut 56, then removing the pitch transmission ring 52 and the stud 22, while the inner and outer bearings 38 and 40 continue to remain in place. It is thus possible to change or inspect the part that has been removed easily. Thereafter, it suffices to loosen the clamping nut 36 in order to be able to change the rolling bearings 38 and 40.

The invention claimed is:

1. A pivot for an adjustable pitch blade for a turbine engine fan hub, the pivot comprising:
    a stud having, at a radially inner end, coupling means for transmitting a twisting torque and an outside thread;
    an annular force-decoupling part positioned around the stud and provided at a radially outer end with an outside thread, said force-decoupling part pressing transversely against the stud at its radially outer end and having no contact with said stud at a radially inner end;
    an outer rolling bearing having an inside ring mounted to press transversely against the radially outer end of the force-decoupling part;
    an inner rolling bearing assembled around the radially inner end of the force-decoupling part and held thereby;
    a pitch transmission ring positioned around the radially inner end of the stud and provided with coupling means co-operating with the coupling means of the stud;
    a first clamping nut screwed onto the outside thread of the force-decoupling part in order to clamp the outer and inner rolling bearings around the fan hub; and
    a second clamping nut screwed onto the outside thread of the stud in order to provide clamping between the stud, the force-decoupling part, and the pitch transmission ring.

2. The pivot according to claim 1, wherein the outer rolling bearing also has an outside ring for being received inside an orifice formed in the fan hub and having the pivot passing therethrough, the inside and outside rings defining raceways for a plurality of balls.

3. The pivot according to claim 2, wherein the first clamping nut is screwed radially against the inside ring of the outer rolling bearing.

4. The pivot according to claim 1, wherein the inner rolling bearing comprises an outside ring mounted around the radially inner end of the force-decoupling part and co-operating with an outside surface thereof to define raceways for a plurality of balls.

5. The pivot according to claim 1, wherein the coupling means of the stud are outer flutings and the coupling means of the pitch transmission ring are inner flutings co-operating with the outer flutings of said stud.

6. The pivot according to claim 1, wherein the stud comprises two distinct portions that are connected together: a radial portion having the coupling means for transmitting twisting torque and the outside thread of the force-decoupling part; and an attachment portion comprising a radial hole having the radial portion passed therethrough.

7. The pivot according to claim 6, wherein the attachment portion further comprises a spot face formed around the hole in order to receive a collar of the radial portion so as to provide a connection between the two portions of the pivot.

8. The blade of variable pitch angle for a turbine engine fan hub, the blade comprising an aerodynamic profile and a pivot according to claim 1.

9. The turbine engine comprising a fan hub and at least one set of blades of variable pitch angle according to claim 8.

* * * * *